(12) United States Patent
Rizzini et al.

(10) Patent No.: US 9,511,750 B2
(45) Date of Patent: Dec. 6, 2016

(54) MANUALLY OPERATED LEVER DEVICE FOR ACTUATING THE PARKING BRAKE OF A MOTOR-VEHICLE

(71) Applicant: FIAT GROUP AUTOMOBILES S.p.A., Turin (IT)

(72) Inventors: Nicola Rizzini, Moncalieri (IT); Fabio Aragno, Turin (IT)

(73) Assignee: FIAT GROUP AUTOMOBILES S.P.A., Turin (IT)

( * ) Notice: Subject to any disclaimer, the term of this patent is extended or adjusted under 35 U.S.C. 154(b) by 72 days.

(21) Appl. No.: 14/519,777

(22) Filed: Oct. 21, 2014

(65) Prior Publication Data

US 2016/0107622 A1    Apr. 21, 2016

(30) Foreign Application Priority Data

Nov. 6, 2013   (IT) .............................. TO2013A0902

(51) Int. Cl.
   *G05G 1/04*      (2006.01)
   *B60T 7/08*      (2006.01)
   *B60T 7/10*      (2006.01)

(52) U.S. Cl.
   CPC ............... *B60T 7/102* (2013.01); *B60T 7/104* (2013.01); *G05G 1/04* (2013.01)

(58) Field of Classification Search
   CPC ............ B60T 7/08; B60T 7/102; B60T 7/104; G05G 1/04; F16H 2059/0265; Y10T 74/20582; Y10T 74/20612
   See application file for complete search history.

(56) References Cited

U.S. PATENT DOCUMENTS 2,240,783 A    5/1941  Jandus
2,851,898 A *  9/1958  Hasty ..................... G05G 9/085
                                                74/471 R (Continued)

FOREIGN PATENT DOCUMENTS

DE      9112799 U1    2/1993
DE     10027019 A1   12/2001

(Continued)

OTHER PUBLICATIONS

Italian Search Report for IT TO20130902 dated May 19, 2014.*

*Primary Examiner* — Adam D Rogers
(74) *Attorney, Agent, or Firm* — Heslin Rothenberg Farley & Mesiti P.C.; Victor A. Cardona, Esq.

(57) ABSTRACT

A lever device for actuating the parking brake of a motor-vehicle includes a lever structure with a base portion tiltably mounted on a supporting bracket. The mounting includes a first transverse axis, a second transverse axis, a third transverse axis and a fourth transverse axis. When the lever structure is in its completely lowered position, the third and fourth transverse axes are each lower than that of the first and second transverse axes, respectively. In the lowered position, two theoretical planes containing the first and third transverse axes and the second and fourth transverse axes, respectively, intersect along a theoretical axis of instantaneous rotation of the lever structure, which is located above the first and second transverse axes. When the lever structure moves to its completely raised position, the lever arm and its end handgrip displace according to a substantially elliptical, and substantially vertically oriented, path, respectively.

11 Claims, 9 Drawing Sheets

(56) References Cited

U.S. PATENT DOCUMENTS

| | | | | |
|---|---|---|---|---|
| 3,842,687 A * | 10/1974 | Fansler | ............... | B64C 13/30 403/116 |
| 3,987,878 A * | 10/1976 | Hansen | ............... | B60T 1/005 192/219.5 |
| 4,140,027 A * | 2/1979 | Wineburner | ............ | G05G 9/02 74/471 R |
| 4,899,610 A * | 2/1990 | Bourret | ............... | B62K 11/14 188/196 BA |
| 6,457,377 B1 * | 10/2002 | Hsu | ............... | B60T 7/10 74/489 |
| 6,584,871 B2 * | 7/2003 | Burton | ............... | G05G 1/405 74/512 |
| 7,421,927 B2 * | 9/2008 | Terradas | ............... | B60T 7/102 74/512 |
| 8,677,857 B2 * | 3/2014 | Feldt | ............... | A61G 5/1008 74/502.2 |
| 2004/0040403 A1 * | 3/2004 | Hayashihara | ............ | G05G 1/405 74/512 |
| 2010/0170365 A1 | 7/2010 | Kowalski et al. | | |
| 2012/0272779 A1 * | 11/2012 | Brugger | ............... | B25B 13/08 74/502.2 |

FOREIGN PATENT DOCUMENTS

| | | | |
|---|---|---|---|
| EP | 1431148 | A2 | 6/2004 |
| EP | 2468591 | A2 | 6/2012 |
| FR | 2821177 | A1 | 8/2002 |
| FR | 2893897 | A1 | 6/2007 |
| FR | 2934545 | A1 | 2/2010 |
| WO | 2004049091 | A1 | 6/2004 |

\* cited by examiner

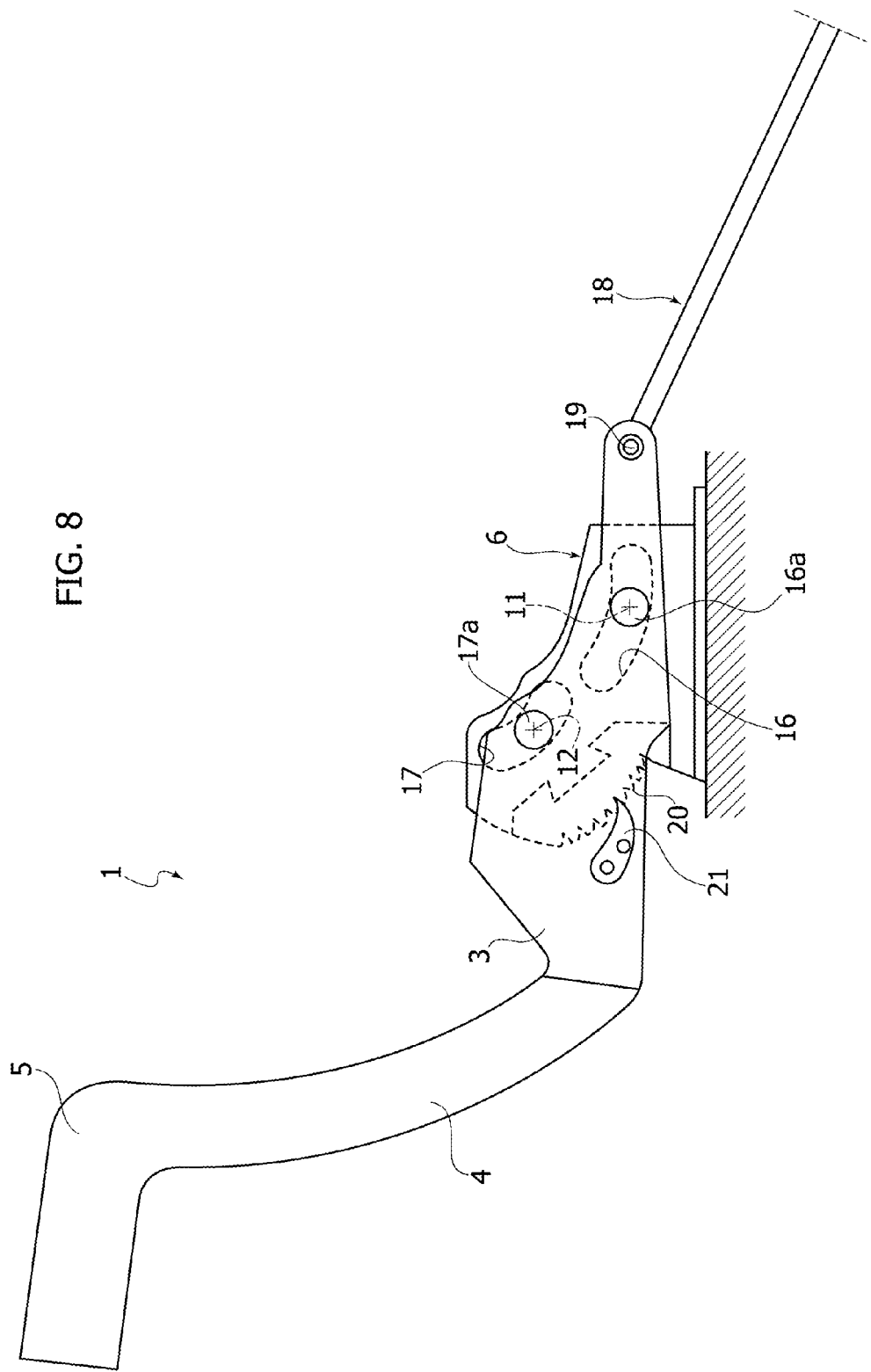

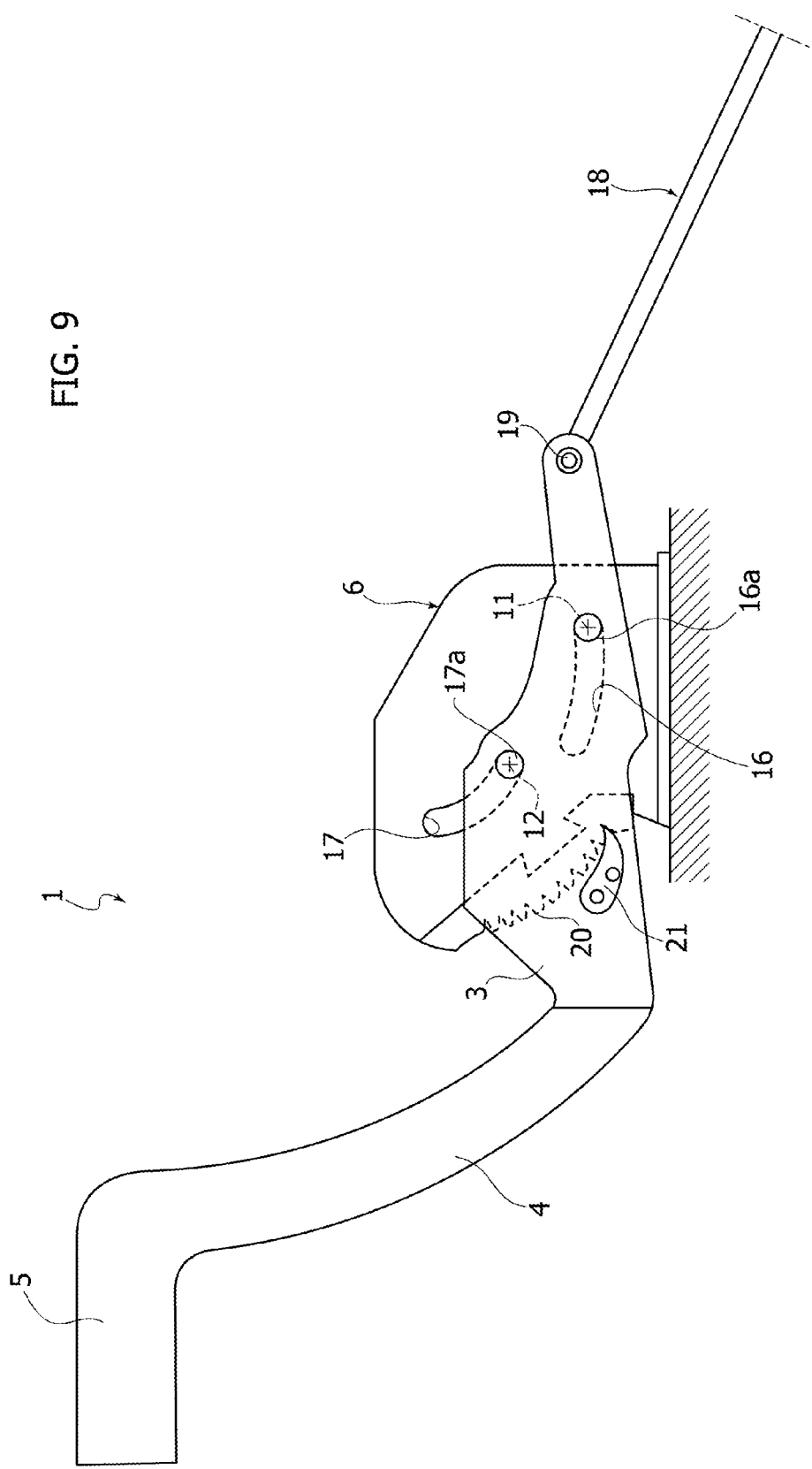

MANUALLY OPERATED LEVER DEVICE FOR ACTUATING THE PARKING BRAKE OF A MOTOR-VEHICLE

CROSS REFERENCE TO RELATED APPLICATIONS

This application claims priority from Italian Patent Application No. TO 2013 A 000902 filed on Nov. 6, 2013, the entire disclosure of which is incorporated herein by reference.

FIELD OF THE INVENTION

The present invention relates to a manually operated lever device for actuating the parking brake of a motor vehicle. In particular, the invention relates to a lever device of the type comprising:

a supporting bracket, rigidly connected to the structure of the motor vehicle; and a lever structure, having:

a base portion tiltably mounted on the supporting bracket; and a lever arm extending from a front end of said base portion and terminating with a handgrip, so that said lever structure is movable between a completely lowered position and a completely raised position with respect to said supporting bracket, wherein the tiltable mounting of the base portion on the supporting bracket comprises:

a first transverse axis and a second transverse axis, which are defined in fixed positions with respect to the supporting bracket; and a third transverse axis and a fourth transverse axis, which are defined on said base portion of the lever structure in positions spaced apart from one another, said third transverse axis and said fourth transverse axis being guided for moving along respective paths, substantially about said first transverse axis and about said second transverse axis, the lever structure being moreover operatively connected to a transmission for actuating the parking brake of the motor vehicle.

PRIOR ART

A lever device of the type referred to above is described and illustrated in document US 2010/0170365 A1. In the more conventional solutions, the lever for actuating the parking brake is pivotally mounted around a single axis of articulation. The path that the handgrip of the lever follows in its movement of actuation must obviously not be hindered by other components of the vehicle if it is desired to ensure that the user can gain access to the lever and operate it in a safe, convenient, and easy way. Consequently, the passenger compartment of the motor vehicle must be designed so as to meet this need. In many cases, the lever for operating the parking brake is provided in the space available between the seat of the driver and the front seat on the passenger side. The console provided between the two seats must hence be designed so as to receive the lever for actuating the parking brake and enable proper operation throughout the entire range of movement thereof, which sets limits on the design of the console, with reference, for example, to provision thereon of glove compartments or bottle holders. This problem becomes even more acute in cars of small size, which by their very nature have a very limited space between the two front seats.

In an attempt to solve the aforesaid problem, the document mentioned above has proposed a multi-link configuration of the structure of the lever in order to enable a movement of the handgrip of the lever that is less invasive with respect to the adjacent parts of the motor vehicle and in particular with respect to the portion of the console located behind the handgrip of the lever. This solution does not, however, solve the aforesaid problem in an optimal way, in so far as it involves a movement of the linkage structure of the lever into the space above it when the lever is raised. Furthermore, this known solution leads to a relatively complex and costly structure.

OBJECT OF THE INVENTION

The object of the present invention is to solve the technical problem set forth above in a satisfactory way.

A further object of the invention is to achieve the above aim with a relatively simple and low-cost lever structure.

A further object of the invention is to achieve the aforesaid aims with a lever structure that will moreover enable reduction of the effort of operation for the user, in particular in the final step of raising of the lever.

A further object of the invention is to obtain a structure that, with minor changes, will enable modification of the initial position and final position and path of the handgrip according to any specific requirements.

SUMMARY OF THE INVENTION

With a view to achieving the above purposes, the subject of the invention is a lever structure having the characteristics specified in the annexed claim 1, which forms an integral part of the present description.

In the device according to the invention, when the lever structure is in its completely lowered position, the third and fourth transverse axes carried by the base portion of the lever structure are each located in a position lower than that of the first and second transverse axes of the supporting bracket, and the two planes containing the first and third transverse axes and the second and fourth transverse axes intersect along a theoretical axis of instantaneous rotation of the lever structure that is located above said first and second transverse axes. The aforesaid arrangement is such that, when the lever structure moves from its completely lowered position to its completely raised position, the arm of the lever and its end handgrip displace according to a substantially elliptical, and substantially vertically oriented, path, whilst said axis of instantaneous rotation of the lever structure moves downwards, also following a substantially elliptical path.

Due to the aforesaid characteristics, the space adjacent to the lever and located behind its handgrip remains completely free throughout the entire range of movement of the lever, and also the connection system of the lever to the supporting bracket does not come to occupy even just partially the space above the aforesaid first and second axes defined on the bracket when the lever is raised.

In one embodiment, the tiltable mounting of the base portion on the supporting bracket comprises:

a first connection arm, having a first end and a second end, said first end being pivotally mounted on the supporting bracket about said first transverse axis, and said second end being pivotally connected to said base portion about said third transverse axis; and a second connection arm, having a first end and a second end, the first end of the second connection arm being pivotally mounted to the supporting bracket about said second transverse axis, and the second end of the second connection arm being pivotally connected to said base portion about said fourth transverse axis.

As an alternative to the use of the two connection arms, it may be provided that in positions corresponding to said third and fourth transverse axes the base portion of the lever structure will carry two pins or sliders or similar guide-follower elements slidably mounted in guide tracks (slits or grooves or cam tracks) formed on the aforesaid supporting bracket.

In the case where the two guide tracks are shaped according to circular paths, in addition to the two guide tracks also the two aforesaid connection arms, or even only one of them, may be provided.

In the case, instead, where the lever structure 2 is mounted on the supporting bracket only by engagement of the aforesaid guide-follower elements within the two guide tracks, the latter may be configured according to generic paths, i.e., not only circular ones, but also elliptical or rectilinear, or even according to complex profiles including rectilinear and/or curvilinear portions of any suitable configuration.

The embodiment of the invention that provides only two guide tracks, without connection arms, leaves the designer with a total freedom both in configuring the type of movement of the lever and in configuring the position of the lever at the two ends of its movement. Furthermore, this solution enables a reduction of the vertical dimension of the supporting bracket, since it is not necessary that the bracket extends in a region defining first and second axes of articulation for guiding the movement of the lever.

Obviously, in the case of embodiments in which the guide tracks are not circular, the aforesaid third and fourth axes do not move exactly about a first axis and a second axis of the supporting bracket so that said first and second axes as defined herein are to be understood in these embodiments as the respective centres of instantaneous rotation of the third and fourth axes in each position of the lever.

According to a further preferred characteristic of the invention, the arm of the lever that extends from the front end of the aforesaid base portion has a curved, goose-neck-like, conformation with the convexity facing forwards and having a profile similar to the profile of the elliptical path followed by the arm of the lever in its movement.

The aforesaid curved goose-neck-like conformation is in itself known. However, the combination of this characteristic with the specific geometry of the mounting arrangement used for the lever according to the invention leads to the further advantage that the slit provided in the top wall of the console of the motor vehicle, through which the end handgrip of the lever projects, can have a minimum longitudinal dimension. This is due to that the portion of the lever arm that is located within the slit has a reduced or zero longitudinal movement relative to the slit during movement of the lever.

Of course, associated to the structure of the lever according to the invention is a locking device of any known type (for example, of the ratchet-mechanism type) for locking the lever structure in any selected position between the completely lowered position and the completely raised position. According to the conventional technique, moreover, associated to the lever is a pushbutton for release of the locking device. The transmission for actuating the parking brake may also be of any known type and is typically constituted by a flexible-cable transmission or a transmission with push-rods and rockers, connected either directly or indirectly to the base portion of the lever structure.

The mounting linkage of the lever according to the invention functions as a multiplying transmission, so that for a given raising angle of the lever handgrip, a rotation is obtained of the first connection arm, to which the lever base portion is articulated, that can be even twice as much; a consequent linear displacement of the cable transmission, which is anchored to the base portion, is obtained. Therefore, the aforesaid arrangement also leads to a reduction of the effort that the user has to apply to overcome the reaction of the transmission, in particular in the final step of the lever raising movement.

Therefore, the device according to the invention also has the advantage of being of easier and more convenient to be used.

DESCRIPTION OF SOME PREFERRED EMBODIMENTS

Further characteristics and advantages of the invention will emerge from the ensuing description with reference to the annexed drawings, which are provided purely by way of non-limiting example and in which:

FIGS. 6-9 illustrate further embodiments.

The ensuing description intends to provide only some examples of embodiment of the present invention with reference to the characteristics that directly form a subject of the invention. As will emerge immediately evident to persons skilled in the branch, the solutions described herein may be implemented by varying extensively their details of construction. Furthermore, the ensuing description does not comprise an illustration of the parts and of the components that do not directly form a subject of the invention and that can be obtained in any known way. In particular, the description is limited to describing in its general configuration the structure of a lever for operating the parking brake of a motor vehicle, without entering into its constructional details and into the materials used. The same applies to the configuration and arrangement of the end handgrip of the lever, which may be of a longitudinal type or with a transverse-gripping handle. Illustrated herein only schematically is the locking device associated to the operating lever, which enables locking of the lever in any selected position between its completely lowered position and its completely raised position, the constructional details of the device for release of the locking device being omitted, since it can be obtained in any known way. Likewise, the constructional details regarding the transmission that connects the structure of the operating lever to the parking brakes of the motor vehicle are not illustrated. All the aforesaid constructional details can be obtained, as mentioned, in any known way and, taken alone, do not form part of the invention. Their elimination from the annexed drawings moreover renders the latter easier to understand.

Figure 1:
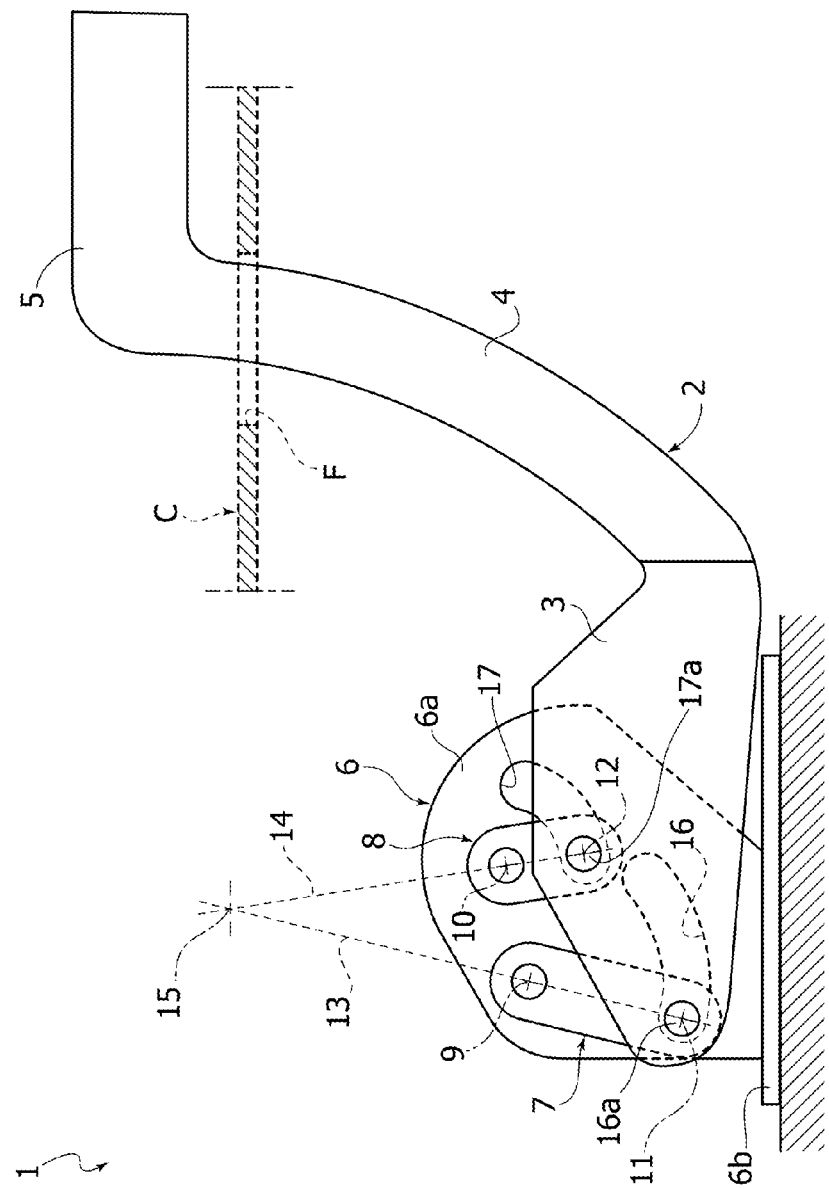
FIGS. 1-3 are schematic lateral views of the lever device according to one embodiment of the invention, in three different operating positions.

To come now to FIG. 1, illustrated schematically therein is a manually operated lever device 1, for actuating the parking brake of a motor vehicle. The lever device 1 comprises a lever structure 2 including a base portion 3 having a front end extending from which is an arm 4 terminating with an end handgrip 5 having any desired conformation. For instance, the handgrip 5 may be obtained in the form of a longitudinally extending handgrip or else in the form of a transverse handgrip, as is in itself known in the art.

The terms "longitudinal" and "longitudinally", as used in the present description, refer to the longitudinal direction of the motor vehicle, in the condition where the device according to the invention is mounted on the motor vehicle. The terms "transverse" and "transversely" refer to a horizontal direction orthogonal to the longitudinal direction of the motor vehicle.

The base portion 3 of the lever structure 2 is tiltably mounted on a supporting bracket 6, of any suitable configuration fixed by connection means of any type to the structure of the motor vehicle. In the schematic example illustrated, the supporting bracket 6 comprises a vertical wall 6a extending upwards from a base wall 6b screwed to the floor panel of the motor vehicle.

The base portion 3 of the lever structure 2 is tiltably mounted on the vertical wall 6a of the bracket 6 by means of a connection system that in the embodiment illustrated in FIGS. 1-4 comprises a first connection arm 7 and a second connection arm 8.

The first connection arm 7 has a first end mounted in an articulated way on the wall 6a of the bracket 6 about a first transverse axis 9. The second connection arm 8 has a first end mounted in an articulated way on the wall 6a of the bracket 6 about a second transverse axis 10 located in front of the first transverse axis 9 (with reference to the direction of advance of the motor vehicle). In the example illustrated, which regards a preferred solution, the second transverse axis 10 is moreover located substantially at the same height as the first transverse axis 9. The expression "substantially at the same height" is meant to indicate that a theoretical plane containing the axes 9, 10 is inclined with respect to a horizontal plane by an angle comprised between 0° and 45°. However, this characteristic is peculiar to the example of embodiment illustrated, without excluding possible variants in which the angle is comprised between 45° and 90°.

Given that the first transverse axis 9 and the second transverse axis 10 are defined on the supporting bracket 6, they are in a fixed position with respect to the structure of the motor vehicle. The base portion 3 of the lever structure 2 is pivotally connected about a third transverse axis 11 and a fourth transverse axis 12, respectively, to the second end of the first connection arm 7 and to the second end of the second connection arm 8.

FIG. 1 shows the lever structure 2 in its completely lowered position. In this position, the two connection arms 7, 8 are oriented with their second ends arranged at a level lower than that of the first ends and hence with the axes 11, 12 arranged at a level lower than that of the axes 9, 10. Furthermore, once again with reference to the completely lowered position of the lever, the two connection arms 7, 8 are oriented with the pairs of axes 9, 11 and 10, 12 arranged in two planes 13, 14 that intersect along an axis 15 of instantaneous rotation of the lever structure 2, which is located above the first and second transverse axes 9, 10.

Figure 3:
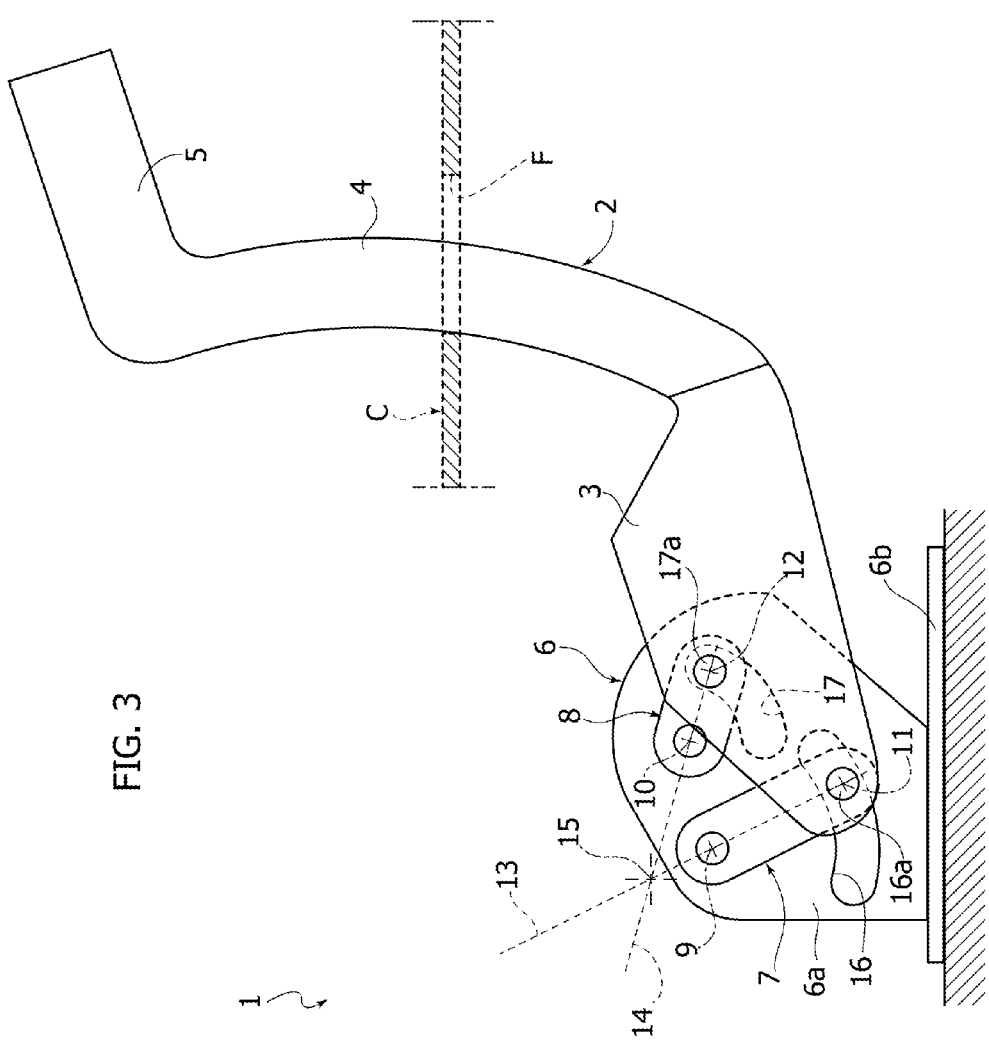
Figure 4:
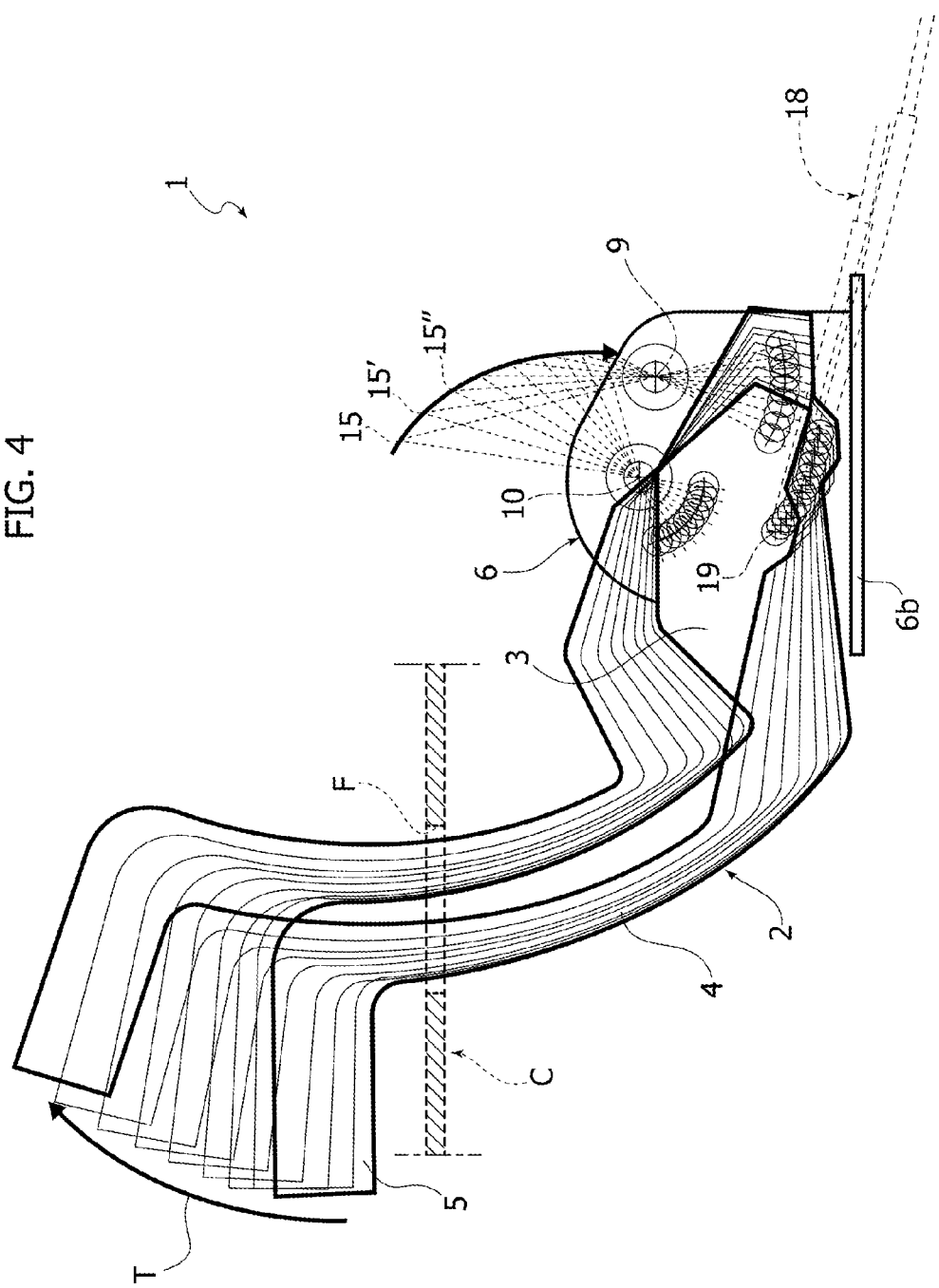
FIG. 4 is a further schematic lateral view that shows, arranged on top of one another, the various positions assumed by the lever during its movement of raising.

As a result of the arrangement described above, the movement of the lever structure 2 when this is brought from the completely lowered position (illustrated in FIG. 1) to a completely raised position (illustrated in FIG. 3) the arm 4 of the lever and the end handgrip 5 displace according to a path T, represented in FIG. 4, which is substantially elliptical and substantially vertical, so that the area behind the handgrip 5 remains substantially free throughout the range of movement of the lever 2, and the base portion 3 and the connection arms 7, 8 do not "invade" the space above them when the lever is raised, unlike what occurs in known solutions.

Indicated schematically in FIG. 1 is the top profile C of a console that covers the structure of the lever 2, which is typically designed to be positioned in the space between the two front seats of a motor vehicle. The fact that the space underneath said profile remains substantially free throughout the range of the movement of the lever 2 enables the designers to exploit the aforesaid space for designing the console with the maximum freedom possible, envisaging glove compartments, or bottle holders, or the like.

Figure 2:
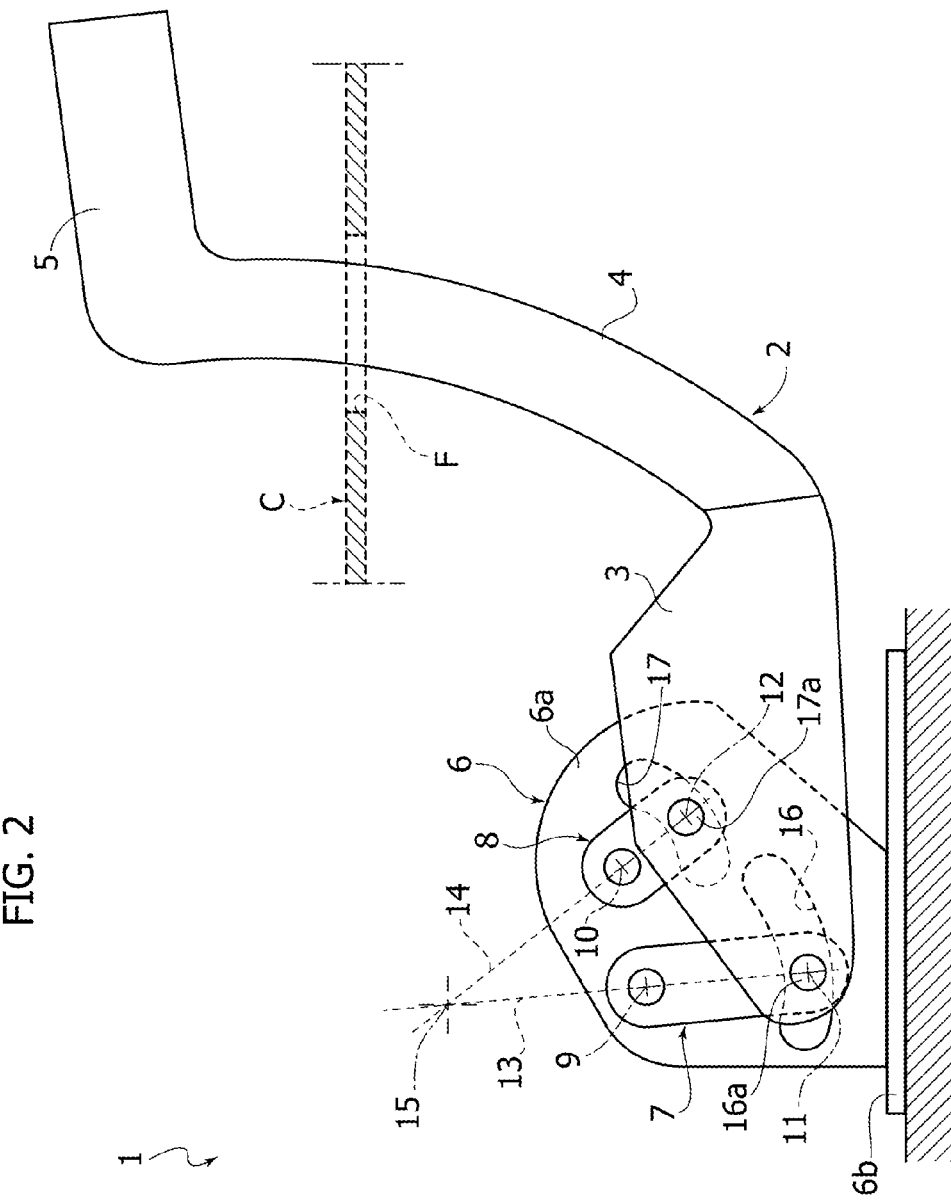

As referred to above, FIG. 1 of the annexed drawings shows the lever in the completely lowered position, FIG. 3 shows the lever in the completely raised position, and FIG. 2 shows the lever in an intermediate position.

According to a further preferred characteristic of the invention, the arm 4 of the lever that extends from the front end of the base portion 3 of the lever has a curved, goose-neck, conformation with the convexity facing forwards. This conformation is in itself known. However, its application to the present invention enables a further advantage to be obtained. The curved conformation of the arm 4 can in fact be obtained according to a profile similar to that of the elliptical path followed by the arm 4 and by the handgrip 5 during movement of the lever. In this way, the portion of the arm 4 that is located in a position corresponding to the top wall C of the console in each position assumed by the lever 2 during its movement, displaces little or nothing in the longitudinal direction of the motor vehicle. Consequently, the wall C of the console can be provided with a slit F having a minimum dimension in the longitudinal direction, which again enables better exploitation of the space available on the top wall of the console. This aspect is rendered evident by a comparison of FIGS. 1, 2, 3, and 4.

FIG. 4 of the annexed drawings shows one the various positions assumed by the lever during its movement from the completely lowered position to the completely raised position superimposed. The above figure shows the path T followed by the top part of the lever in its movement, which has a substantially elliptical and substantially vertical conformation. FIG. 4 also shows the path followed by the axis of instantaneous rotation 15, i.e., by the theoretical axis defined, for each position assumed by the lever 2, by the intersection of the planes passing through the axes 9, 11 and 10, 12. As may be seen, as the lever is raised the centre of instantaneous rotation 15 always remains above the axes 9, 10 but drops downwards, following an elliptical path, as the lever moves towards its raised position.

Figure 5:
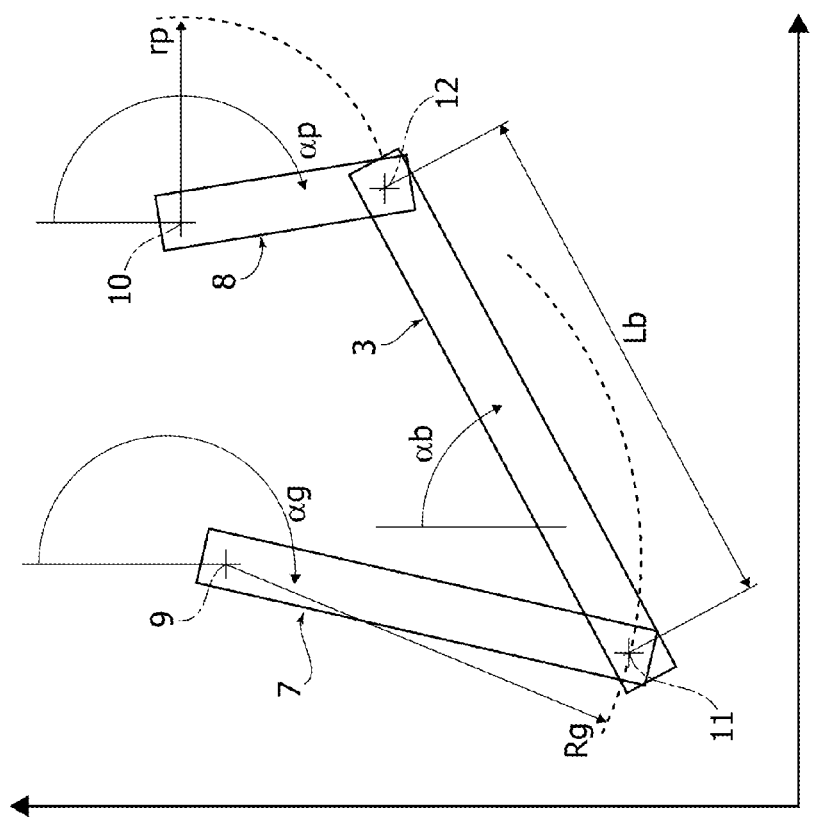
FIG. 5 is a diagram that represents the geometry of the connection system adopted in the lever according to the invention.

FIG. 5 of the annexed drawings shows a diagram of the connection between the structure of the lever according to the invention and the supporting bracket 6. This figure also gives the various parameters that establish the geometry of the connection system.

Figure 6:
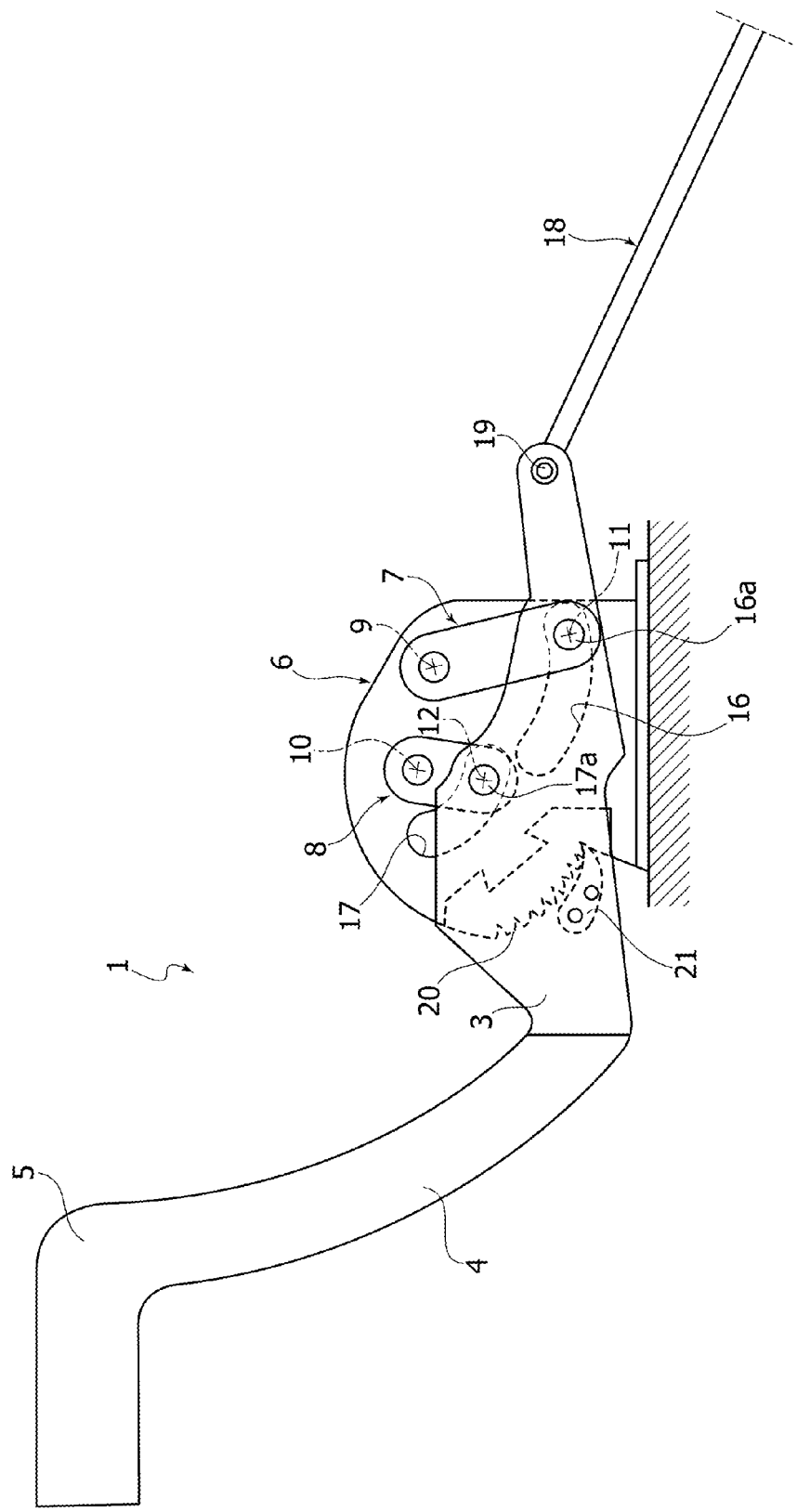

FIG. 6 shows a further schematic view of the embodiment described above of the invention, which also represents schematically the basic components of the locking device associated to the lever, comprising a toothed sector 20, preferably constituted by a separate element fixed on the bracket 6 (for example, by welding), and a pawl 21 co-operating therewith. The figure does not illustrate the further constructional details of the locking device, which, as already mentioned, can be obtained in any known way. The pawl 21 is of course connected to a release device (not illustrated) associated to the handgrip 5. Likewise in compliance with the known art, the aforesaid device can be provided with an anti-release safety device.

The choice of the toothed sector constituted by a separate element mounted on the bracket 6 proves advantageous in the case where, for any reason, it may be desired to modify some parameters of the mechanism (in general, the four lengths of the rods of the mechanism or only simply the two points of articulation of the two connection arms on the supporting bracket). Within certain limits it will be sufficient to replace only this sub-component to get it to follow the movement of the lever and guarantee proper operation of the pawl 21.

Of course, as will emerge immediately evident to persons skilled in the branch, without prejudice to the fundamental characteristics described above, the aforesaid parameters (and in particular the length of the connection arms 7, 8 and their orientation) may be chosen so as to meet any specific requirement, either with reference to the movement of the lever or with reference to the position of the lever in the completely lowered or completely raised condition, as well as the required operating loads.

In the specific case illustrated by way of non-limiting example, the connection arm 8 has a substantially shorter length than the connection arm 7.

As may be seen in FIGS. 1-3, the second ends of the connection arms 7, 8 carry in positions corresponding to their axes of connection 11, 12 respective pins 16a, 17a guided in guide tracks 16, 17 (for example, in the form of slits or grooves or cam surfaces), arranged according to respective arcs of a circle substantially centred on the axes 9 and 10.

Figure 7:
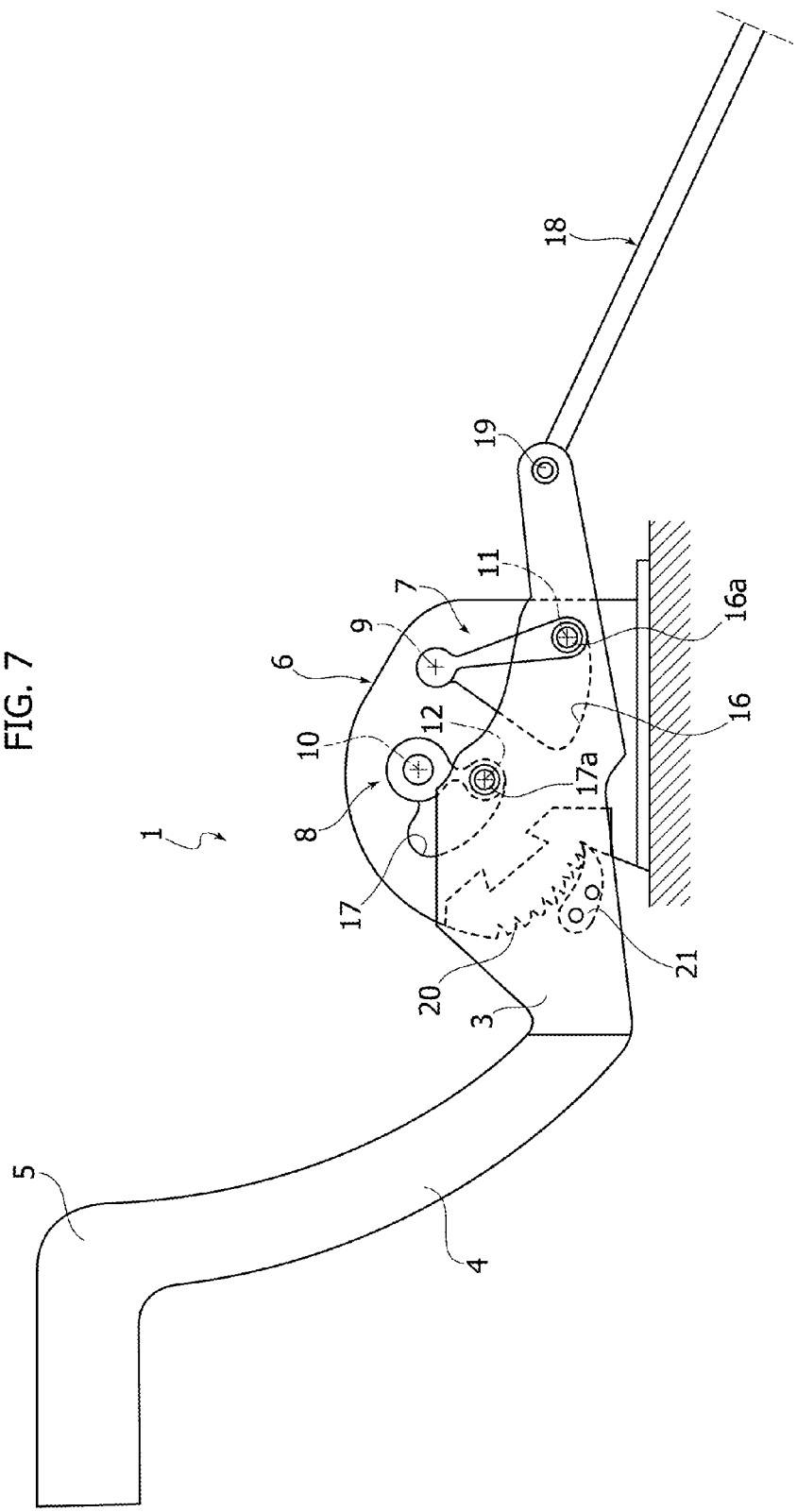

FIG. 7 shows a variant of the solutions of FIGS. 1-4 and 6, where each of the connection arms 7, 8 is pivotally mounted to the supporting bracket 6 about the axes 9 and 10 without the aid of articulation pins, but simply in so far as the first ends of the arms 7, 8 are shaped like a cylindrical hinge element and are received in a rotatable way within respective seats formed in the bracket 6. The seats for the hinge ends of the arms 7, 8 form part of triangular openings 16, 17 shaped to enable the oscillations of the arms 7, 8 and to define, each, with its two opposite sides, the end-of-travel positions of the respective arm. This solution, as has been said, avoids the use of the pins for articulation to the axes 9 and 10 and bestows greater strength on the lever 2, at the same time also limiting any play and lateral encumbrance.

According to an alternative embodiment (illustrated in FIGS. 8 and 9), the base portion 3 is mounted on the supporting bracket 6 only via engagement of the pins 16a, 17a in the guide tracks 16, 17 (see FIGS. 7 and 8), i.e., without providing the connection arms 7, 8. In the example of FIG. 7, the two guide tracks 16, 17 can be configured according to circular arcs, preferably with radiuses markedly different from one another. Alternatively, the guide tracks 16, 17 are profiled according to non-circular arcs, for example elliptical arcs (as in the case of FIG. 8), or again according to complex profiles including arched and/or rectilinear portions, of any suitable configuration. In the case of this solution, the movement of each of the axes 11 and 12 may hence be any and not resemble even approximately a rotation about a respective axis 9 or 10. Consequently, the configuration that envisages only two guide tracks, without connection arms, confers on the designer a total freedom both in configuring the type of movement of the lever 2 and in configuring the position of the lever in its points of end-of-travel.

Furthermore, as may be seen, for example, in FIG. 8, this solution enables reduction of the dimensions of the bracket 6 to the bare minimum, in so far as it is not necessary to provide thereon the axes of articulation 9 and 10 for guiding the movement of the lever 2.

Obviously, in the case of embodiments in which the paths 16, 17 are not circular, the third and fourth axes 11, 12 do not move exactly about a first axis 9 and a second axis 10, so that these first and second axes as defined herein are to be understood in this case as the respective instantaneous centres of rotation of the axes 11, 12 in each position of the lever 2.

As already referred to above, the expression "guide tracks" is here used to indicate any type of guide suitable for forcing two pins or equivalent elements carried by the lever 2 to follow respective given paths. Falling within this term are, for example, guide slits or grooves or also cam surfaces of any type. Likewise, the engagement elements 16a, 17a of the two guide tracks 16, 17 may take the form of pins, or else also sliders, or guide-follower elements of any type.

In all the embodiments of the invention, the paths and points of start and arrival (in height and longitudinal position) may be varied within the limits envisaged simply by varying the guides or the characteristic kinematic lengths of the components (for example, the arms 7, 8 and/or the paths 16, 17), to the advantage of standardization of the components.

The proportions between the various lengths of the connection arms 7, 8, and the distance between the axes 11, 12, as well as the angles that define the orientation of the arms 7, 8 in the condition corresponding to the completely lowered position of the lever, as these may be inferred from FIG. 5, constitute only a preferred, but non-limiting, example of the invention, it being evident that the aforesaid proportions and angles may vary with respect to what is illustrated herein. FIG. 5 has is in any case provided by way of illustration of the values of the aforesaid proportions and angles in the preferred example.

To return to FIG. 4, likewise schematically illustrated therein is the flexible cable or rod 18 for actuating the parking brake of the motor vehicle, which is connected (directly or indirectly) to the base portion 3 of the lever structure 2 on an axis 19. FIG. 4 shows how a desired travel of the cable 18, corresponding to an angle of rotation A of the connection arm 7, is obtained with an angular variation B of the position of the handgrip 5 that is approximately one half of the rotation of the arm 7. The connection system described hence performs also the function of a multiplying transmission in the sense that a given angular variation of the position of the handgrip 5 determines a much greater angular variation of the connection arm 7 such as to ensure the desired linear displacement of the transmission cable 18. As a result of the arrangement described, there is also obtained a reduction of the effort that the user has to apply to overcome the reaction of the transmission, this reduction being particularly accentuated in the final step of raising of the lever. Consequently, the invention, in addition to presenting the advantages described above as regards a greater freedom of exploitation of the space adjacent to the lever, presents also the advantage of being more comfortable and easy to use.

As emerges clearly from the foregoing description, the invention confers a total freedom on the designer in defining the movement of the lever and its position in the two end points of its movement. This advantage is particularly evident in the solution that envisages installation of the base portion of the lever on the supporting bracket only by means of two guide tracks, however these may be shaped, engaged by two pins or sliders or similar guide-follower elements carried by the aforesaid base portion. In this case, the invention can be defined in broader terms, as follows:

a manually operated lever device for actuating the parking brake of a motor vehicle, comprising:
a supporting bracket (6) rigidly connected to the structure of the motor vehicle; and
a lever structure (2), having:
a base portion (3) tiltably mounted on the supporting bracket (6); and
a lever arm (4) extending from a front end of the aforesaid base portion (3) and terminating with a handgrip (5),
so that the above lever structure (2) is movable between a completely lowered position and a completely raised position with respect to the aforesaid supporting bracket (6),
said lever device being characterized in that the aforesaid base portion (3) is tiltably mounted on said supporting bracket (6) by means of engagement of two guide-follower elements (16a, 17a) in two guide tracks (16, 17) provided on the aforesaid supporting bracket (6) and shaped in such a way as to impart upon said guide-follower elements two independent paths comprising curvilinear and/or rectilinear stretches, so that, when the lever structure (2) moves from its completely lowered position to its completely raised position, the aforesaid lever arm (4) and its end handgrip (5) displace according to a substantially elliptical, and substantially vertically oriented, path, leaving the space behind said handgrip (5) and above said supporting bracket (6) free.

Naturally, without prejudice to the principle of the invention, the details of construction and the embodiments may vary widely with respect to what has been described and illustrated herein, purely by way of example, without thereby departing from the scope of the present claims.

For instance, where the annexed drawings show a single connection arm 7 and a single connection arm 8, it is preferably envisaged that each of them corresponds to two arms arranged alongside one another at the two sides of the supporting bracket, with the base portion of the lever that remains on one side at the outside of the two connection arms.

What is claimed is:
1. A manually operated lever device for actuating a parking brake of a motor-vehicle, comprising:
a supporting bracket, connected to a structure of the motor vehicle; and
a lever structure, having:
a base portion tiltably mounted on the supporting bracket; and
a lever arm extending from a front end of said base portion and terminating with a handgrip,
so that said lever structure is movable between a completely lowered position and a completely raised position with respect to said supporting bracket,
wherein a tiltable mounting of the base portion on the supporting bracket comprises:
a first transverse axis and a second transverse axis, which are defined at predetermined positions with respect to the supporting bracket;
a third transverse axis and a fourth transverse axis, which extend through said base portion of the lever structure in positions arranged spaced apart from one another;
said third transverse axis and said fourth transverse axis being constrained to move along respective paths, about said first transverse axis and about said second transverse axis;
the lever structure being operatively connected to a transmission for actuating the parking brake of the motor vehicle,
said second transverse axis located in front of said first transverse axis, with reference to a direction of forward advancement of the motor-vehicle;
when the lever structure is in the completely lowered position, said third transverse axis and said fourth transverse axis each located in a position lower than that of the first transverse axis and the second transverse axis, respectively; and
in said completely lowered position, two planes containing the first and third transverse axes and the second and fourth transverse axes, respectively, intersecting along an axis of instantaneous rotation of the lever structure, which is located above said first and second transverse axes, and
wherein, when the lever structure moves from the completely lowered position to the completely raised position, the lever arm and the handgrip directly connected to the end of the lever arm displace upwardly along a path corresponding to a portion of an ellipse, while said axis of instantaneous rotation of the lever structure moves downwards, following an elliptical path;
wherein the tiltable mounting of the base portion on the supporting bracket comprises:
a first connection arm, having a first end and a second end, said first end being pivotally mounted on the supporting bracket about said first transverse axis, and said second end being pivotally connected to said base portion about said third transverse axis; and
a second connection arm, having a first end and a second end, the first end of the second connection arm being pivotally mounted to the supporting bracket about said second transverse axis, and the second end of the second connection arm being pivotally connected to said base portion about said fourth transverse axis.

2. The device according to claim 1 wherein at positions corresponding to said third and fourth transverse axes, the base portion of the lever structure carries guide-follower elements engaged in guide tracks formed on said supporting bracket, and wherein the third and fourth transverse axes are axial centerlines of the guide-follower elements.

3. The device according to claim 2, wherein at least one of said guide-follower elements is guided by said first or second connection arm to allow a rotation of said first or second connection arm about said first end of said first or second connection arm.

4. The device according to claim 2, wherein said base portion of the lever structure is tiltably mounted on the supporting bracket only by means of engagement of said guide-follower elements in said guide tracks.

5. The device according to claim 4, wherein one or both of said guide tracks are configured according to circular, non-circular or elliptical profiles, or said one or both of said guide tracks comprise curvilinear portions and/or rectilinear portions.

6. The device according to claim 1, wherein the lever arm that extends from the front end of the base portion has a curved shape with a convexity facing forwards.

7. The device according to claim 1, wherein said lever structure is coupled to a locking device for locking the lever structure in any selected position between the completely lowered position and the completely raised position.

8. The device according to claim 1, wherein said transmission for actuating the parking brake is connected to said base portion of the lever structure.

9. The device according to claim 1, wherein the first connection arm and the second connection arm are each connected to the supporting bracket by a rotatable engagement of one end of each arm, said one end of each arm shaped in the form of a cylindrical hinge element, within a corresponding cylindrical seat defined in a substantially triangular opening of said supporting bracket, said substantially triangular opening having opposite sides that define end positions of the first connection arm or the second connection arm.

10. A manually operated lever device for actuating a parking brake of a motor-vehicle, comprising:
 a supporting bracket, connected to a structure of the motor vehicle; and
 a lever structure, having:
  a base portion tiltably mounted on the supporting bracket; and
  a lever arm extending from a front end of said base portion and terminating with a handgrip,
 so that said lever structure is movable between a completely lowered position and a completely raised position with respect to said supporting bracket,
 wherein a tiltable mounting of the base portion on the supporting bracket comprises:
 a first transverse axis and a second transverse axis, which are defined at predetermined positions with respect to the supporting bracket;
 a third transverse axis and a fourth transverse axis, which extend through said base portion of the lever structure in positions arranged spaced apart from one another;
 said third transverse axis and said fourth transverse axis being constrained to move along respective paths, about said first transverse axis and about said second transverse axis;
 the lever structure being operatively connected to a transmission for actuating the parking brake of the motor vehicle,
 said second transverse axis located in front of said first transverse axis, with reference to a direction of forward advancement of the motor-vehicle;
 when the lever structure is in the completely lowered position, said third transverse axis and said fourth transverse axis each located in a position lower than that of the first transverse axis and the second transverse axis, respectively; and
 in said completely lowered position, two planes containing the first and third transverse axes and the second and fourth transverse axes, respectively, intersecting along an axis of instantaneous rotation of the lever structure, which is located above said first and second transverse axes, and
 wherein, when the lever structure moves from the completely lowered position to the completely raised position, the lever arm and the handgrip directly connected to the end of the lever arm displace upwardly along a path corresponding to a portion of an ellipse, while said axis of instantaneous rotation of the lever structure moves downwards, following an elliptical path, and
 wherein at positions corresponding to said third and fourth transverse axes, the base portion of the lever structure carries guide-follower elements engaged in guide tracks formed on said supporting bracket, and wherein the third and fourth transverse axes are axial centerlines of the guide-follower elements.

11. The device according to claim 10, wherein at least one of said guide-follower elements is moreover guided also by means of a respective connection arm connected to said supporting bracket at an end of said connection arm to allow a rotation of said connection arm about said end of said connection arm.

* * * * *